(12) United States Patent
Yokomizo

(10) Patent No.: US 11,544,817 B2
(45) Date of Patent: Jan. 3, 2023

(54) IMAGE DISTRIBUTION APPARATUS, METHOD, AND STORAGE MEDIUM

(71) Applicant: CANON KABUSHIKI KAISHA, Tokyo (JP)

(72) Inventor: Tsuyoshi Yokomizo, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/165,728

(22) Filed: Feb. 2, 2021

(65) Prior Publication Data
US 2021/0248717 A1  Aug. 12, 2021

(30) Foreign Application Priority Data

Feb. 7, 2020  (JP) .............................. JP2020-020169

(51) Int. Cl.
*G06T 3/40* (2006.01)
*G06T 7/00* (2017.01)
*G06T 1/00* (2006.01)

(52) U.S. Cl.
CPC .......... *G06T 3/4053* (2013.01); *G06T 1/0007* (2013.01); *G06T 7/97* (2017.01)

(58) Field of Classification Search
CPC ........ G06T 3/4053; G06T 7/97; G06T 1/0007
See application file for complete search history.

(56) References Cited

U.S. PATENT DOCUMENTS

| 2019/0206369 A1* | 7/2019 | Kempf ................... G09G 5/363 |
| 2021/0049981 A1* | 2/2021 | Seiler ........................ G06T 1/20 |

FOREIGN PATENT DOCUMENTS

JP  2016058994 A  4/2016

* cited by examiner

*Primary Examiner* — Myron Wyche
(74) *Attorney, Agent, or Firm* — Canon U.S.A., Inc. IP Division

(57) ABSTRACT

An image distribution apparatus includes an acquisition unit configured to acquire information about a gazing area specified by a user in a first image, and a transmission unit configured to transmit, from a second image having resolution higher than resolution of the first image and divided into a plurality of tile images, a first tile image where the gazing area belongs and a second tile image adjacent to the first tile image.

13 Claims, 11 Drawing Sheets

IMAGE DISTRIBUTION APPARATUS, METHOD, AND STORAGE MEDIUM

BACKGROUND

Field of the Disclosure

The present disclosure relates to an image distribution apparatus, a method, and a storage medium.

Description of the Related Art

Conventionally, a technique for switching between low-quality image data and high-quality image data as image data to be distributed according to a user operation has been discussed (see Japanese Patent Application Laid-Open No. 2016-58994).

SUMMARY

According to an aspect of the present invention, an image distribution apparatus includes an acquisition unit configured to acquire information about a gazing area specified by a user in a first image, and a transmission unit configured to transmit, from a second image having resolution higher than resolution of the first image and divided into a plurality of tile images, a first tile image where the gazing area belongs and a second tile image adjacent to the first tile image.

Further features of the present disclosure will become apparent from the following description of exemplary embodiments with reference to the attached drawings.

DESCRIPTION OF THE EMBODIMENTS

Figure 1A:
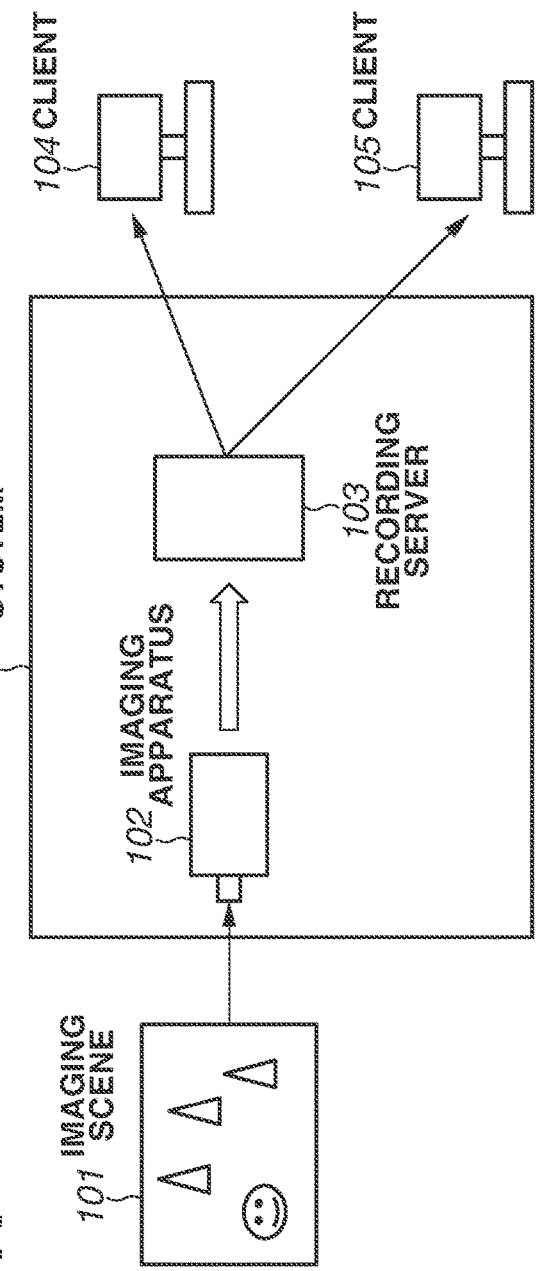
FIGS. 1A and 1B are conceptual diagrams of a system according to a present exemplary embodiment.

FIG. 1A is a diagram illustrating a network configuration according to a first exemplary embodiment. An imaging system 100 includes an imaging apparatus 102 and a recording server 103 (image distribution apparatus), and distributes an imaging scene 101 to clients 104 and 105 operated by users. In FIG. 1A, although the clients 104 and 105 are arranged on the outside of the imaging system 100, the clients 104 and 105 may be arranged on the inside of the imaging system 100. Further, although two clients 104 and 105 are illustrated for the sake of convenience, the number of clients can be one, or two or more. Furthermore, the imaging apparatus 102 and the recording server 103 may be configured integrally.

The imaging apparatus 102 captures the imaging scene 101, generates a plurality of images in different resolutions, and transmits the images to the recording server 103.

Figure 1B:
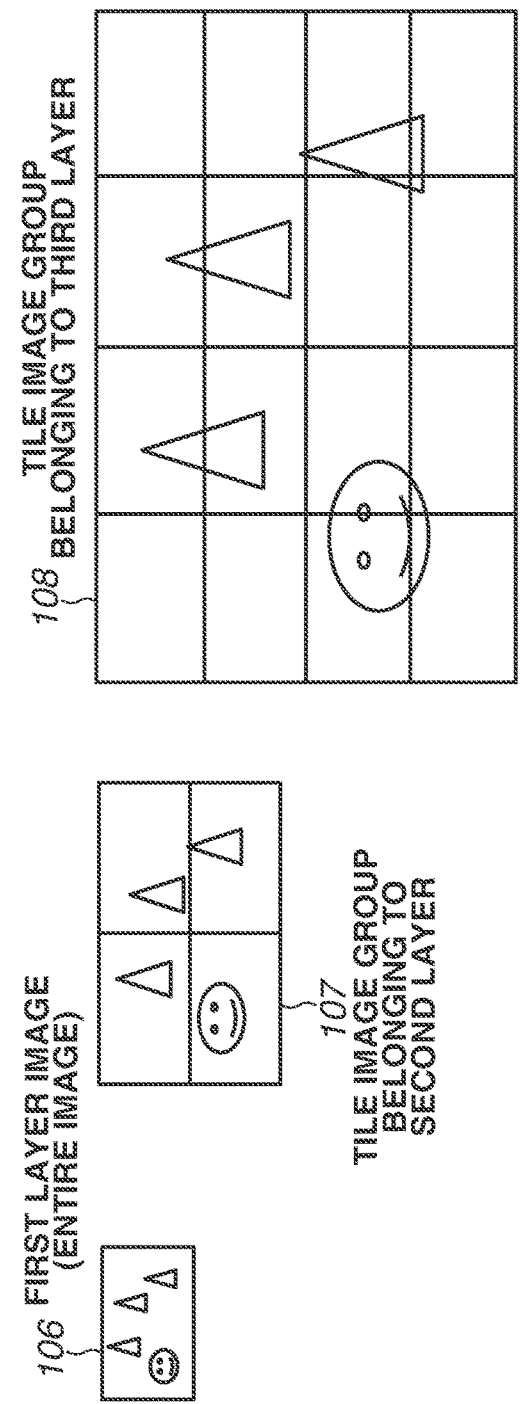

FIG. 1B is a diagram illustrating examples of images generated by the imaging apparatus 102. For example, the imaging apparatus 102 generates a lowest resolution image 106, a medium resolution image 107, and a highest resolution image 108. Herein, the lowest resolution image 106 is called a first layer image, the medium resolution image 107 is called a second layer image, and the highest resolution image 108 is called a third layer image. In other words, an ordinal number applied to a layer image becomes greater when resolution thereof is higher.

For example, the second layer image is divided into four tiles, and images are created for respective divided tile images. Similarly, for example, the third layer image is divided into sixteen tiles, and images are created for respective tile images. Then, each of the images is compressed by a compression unit that executes intra-frame compression and inter-frame compression compliant with a compression standard such as the H.264, and transmitted to the recording server 103. Herein, for the sake of simplicity, the maximum number of layers is specified as 3, and a division number of the i-th layer satisfies the conditions "$n_2=4$" and "$n_3=16$". However, any value can be specified as the maximum number of layers and the division number of the layer.

Figure 2:
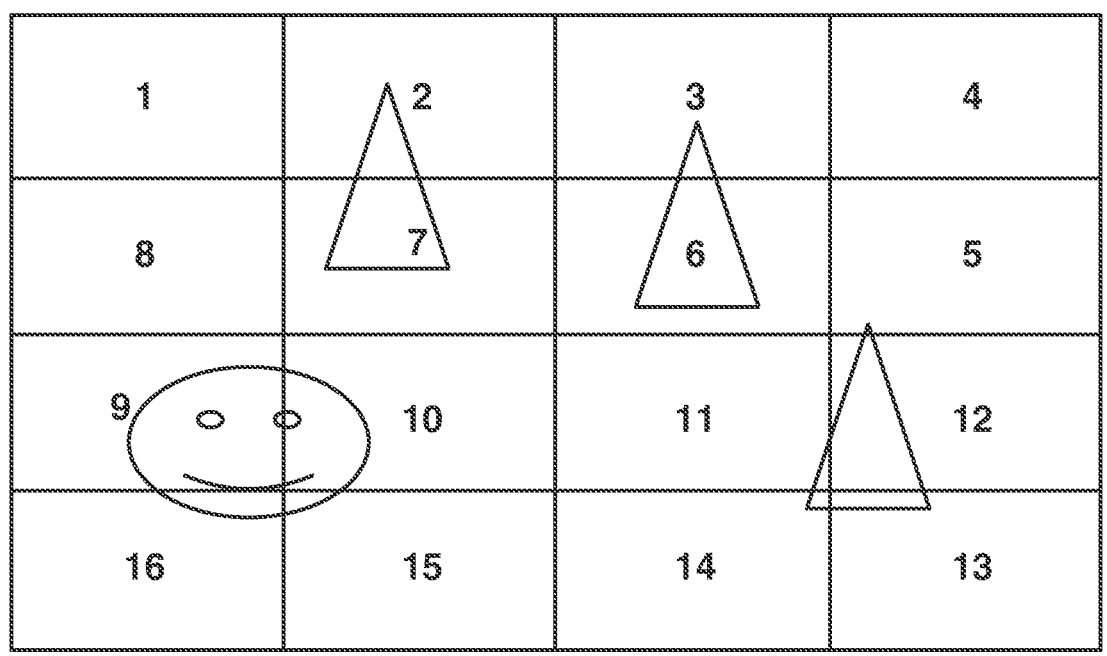
FIG. 2 is a diagram illustrating tile division according to the present exemplary embodiment.

FIG. 2 is a diagram illustrating tile numbers applied to an image divided into tile images. A layer number of an entire image where the tile images belong is expressed as "i", a tile number applied to each of the tile images is expressed as "j", and each of the tile images is expressed as "Aij". For example, as illustrated in FIG. 2, a tile number "1" is applied to a tile at an upper left position as a starting point, and a next tile number is applied to a tile next to that tile on the right. In a case where no tile exists on a right side of one tile, the next tile number is applied to an adjacent tile just below the one tile, so that the tile number is continuously applied in a backward direction. Then, the recording server 103 receives and records a total of $\Sigma_i n_i$ images.

Figure 3:
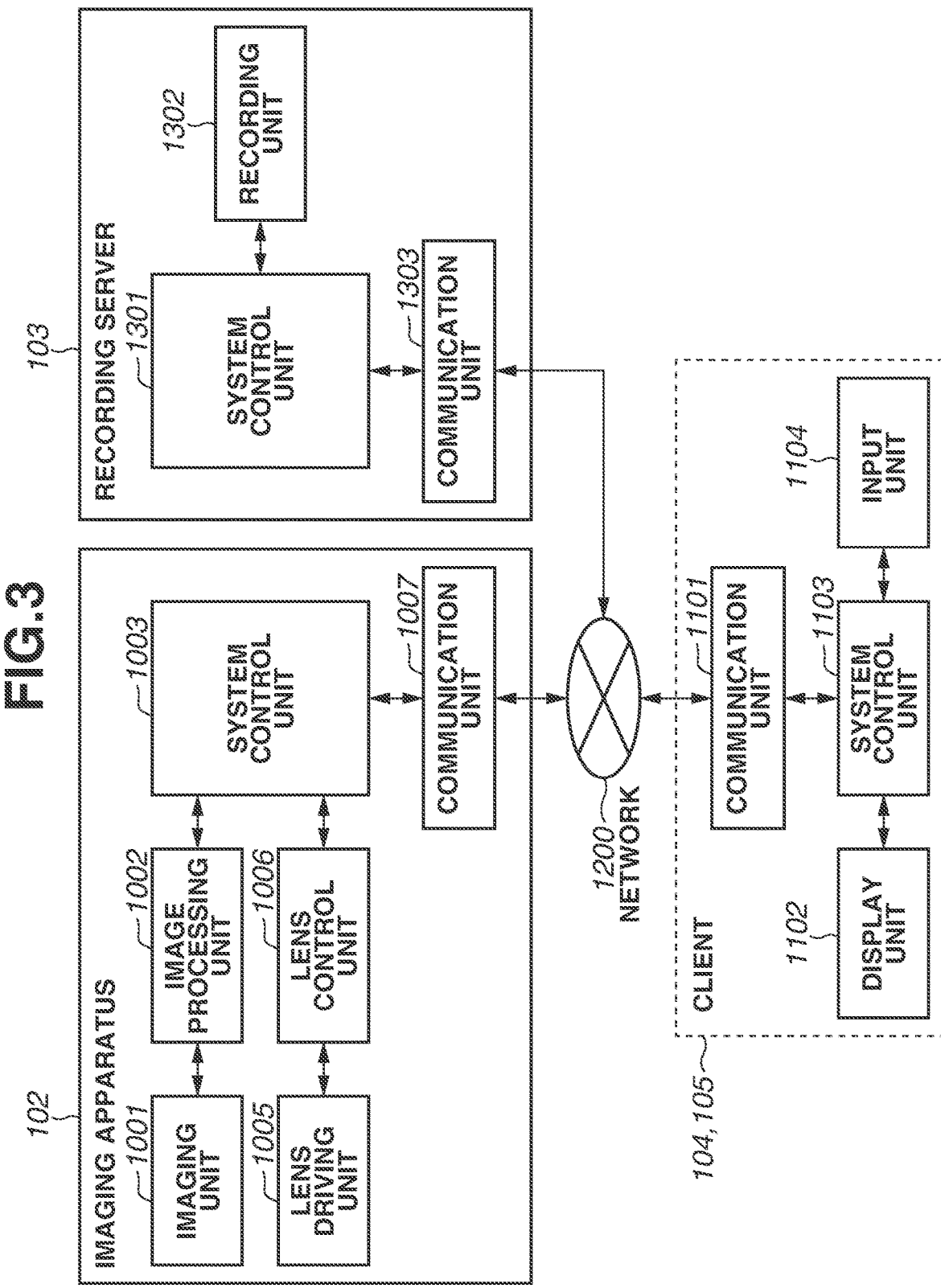
FIG. 3 is a diagram illustrating functional blocks and a system configuration according to the present exemplary embodiment.

FIG. 3 is a functional block diagram of an imaging apparatus, a recording server, and a client, which is an image display apparatus, according to the present exemplary embodiment. The imaging apparatus 102, the recording server 103, the client 104 (105) and a network 1200 are illustrated in FIG. 3. The imaging apparatus 102 includes an imaging unit 1001, an image processing unit 1002, a system control unit 1003, a lens driving unit 1005, a lens control unit 1006, and a communication unit 1007. The recording server 103 includes a system control unit 1301, a recording unit 1302, and a communication unit 1303. The imaging apparatus 102, the clients 104 and 105, and the recording server 103 are connected to each other via the network 1200 in a mutually communicable state.

First, a configuration of the imaging apparatus 102 will be described.

The imaging unit 1001 is configured of an image sensor, and captures an object image and photoelectrically converts the object image to an electric signal.

The image processing unit 1002 executes predetermined image processing on the image which the imaging unit 1001 has captured and photoelectrically converted into a signal, generates image data in a plurality of resolutions, divides the image data into tiles, and executes compression coding processing thereon.

The system control unit 1003 analyzes a camera control command and executes processing according to the command. For example, when a command for changing a zoom value of a lens is received from the recording server 103, the system control unit 1003 instructs the lens control unit 1006 to change a zoom value to execute zoom driving of a lens via the lens driving unit 1005.

The communication unit 1007 transmits a plurality of tile images to the recording server 103 via the network 1200. Further, the communication unit 1007 receives various commands transmitted from the recording server 103 and the clients 104 and 105, and transmits the commands to the system control unit 1003.

Next, a configuration of the recording server 103 will be described.

The system control unit 1301 receives data of tile images in a plurality of resolutions from the imaging apparatus 102 via the communication unit 1303 and instructs the recording unit 1302 to save the data.

In a case where the recording unit 1302 is instructed to save the data by the system control unit 1301, the recording unit 1302 saves the data as recording image data. Further, when the recording unit 1302 is instructed to take out the recording image by the system control unit 1301, the recording unit 1302 transmits the recording image to the system control unit 1301.

Further, the system control unit 1301 receives a transmission instruction of a tile image from the client 104 (105) via the communication unit 1303 and instructs the recording unit 1302 to take out the specified tile image. Then, the system control unit 1301 transmits the acquired tile image to the client 104 (105) via the communication unit 1303.

Next, a configuration of the client 104 (105) will be described.

Typically, a general-purpose computer such as a personal computer is used as the client 104 (105). However, the client 104 (105) can be a mobile terminal such as a smartphone.

The communication unit 1401 receives various types of data distributed from the recording server 103. The various types of data mainly include data describing a setting value of a camera and image data. The image data includes metadata such as spatial size information and position information of each tile image, information that specifies an entire image where each tile image belongs, and size information of the entire image.

A liquid crystal display device is used as the display unit 1402, and an image acquired from the recording server 103 and a graphic user interface (hereinafter, called "GUI") used for controlling a camera are displayed thereon.

The system control unit 1403 displays image data received from the recording server 103 via the communication unit 1401 on the display unit 1402. Further, the system control unit 1403 generates a camera control command according to a user operation performed on the GUI, and transmits the camera control command to the recording server 103 or the imaging apparatus 102 via the communication unit 1401.

A keyboard or a pointing device such as a mouse is used as the input unit 1404, and the user operates the GUI via the input unit 1404. In a case where the client 104 (105) is a mobile terminal, a touch panel and various key buttons are used as the input unit 1404.

As described above, the client 104 (105) can acquire the tile image from the recording server 103 and executes camera control of the imaging apparatus 102 via the network 1200.

Next, a tile image transmitted to the client 104 from the recording server 103 at the time of execution of digital pan/tilt (PT) movement will be described. The digital PT movement is a function that realizes pseudo-pan/tilt movement by moving an area (gazing area) cut out from the entire image.

Figure 4:
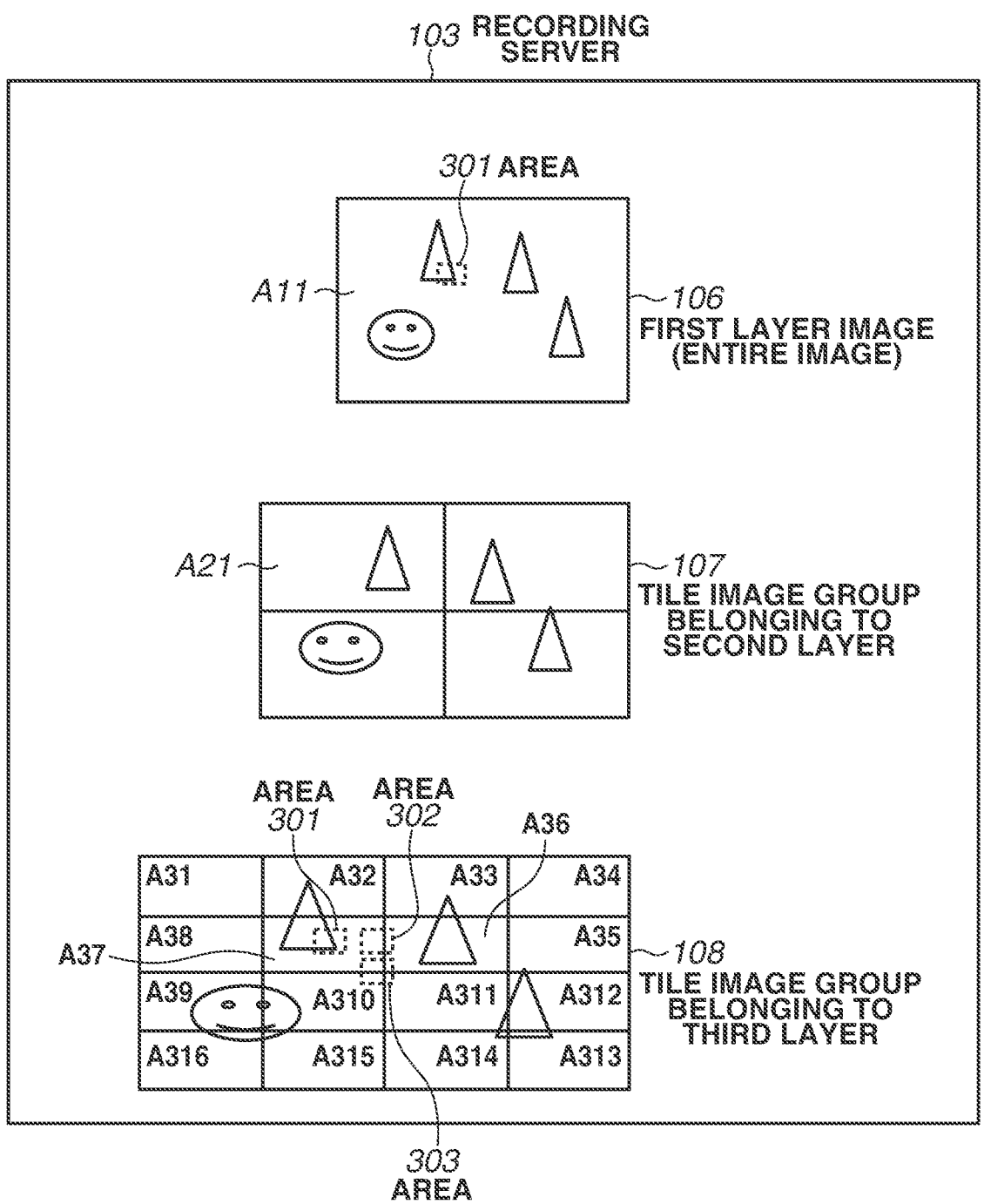
FIG. 4 is a diagram illustrating an example of a tile image group saved in a recording server according to the present exemplary embodiment.

FIG. 4 is a diagram illustrating an example of a group of tile images saved in the recording server 103. In FIG. 4, tile image groups in the first to the third layers are saved in a format similar to the format illustrated in FIG. 1B.

Figure 5:
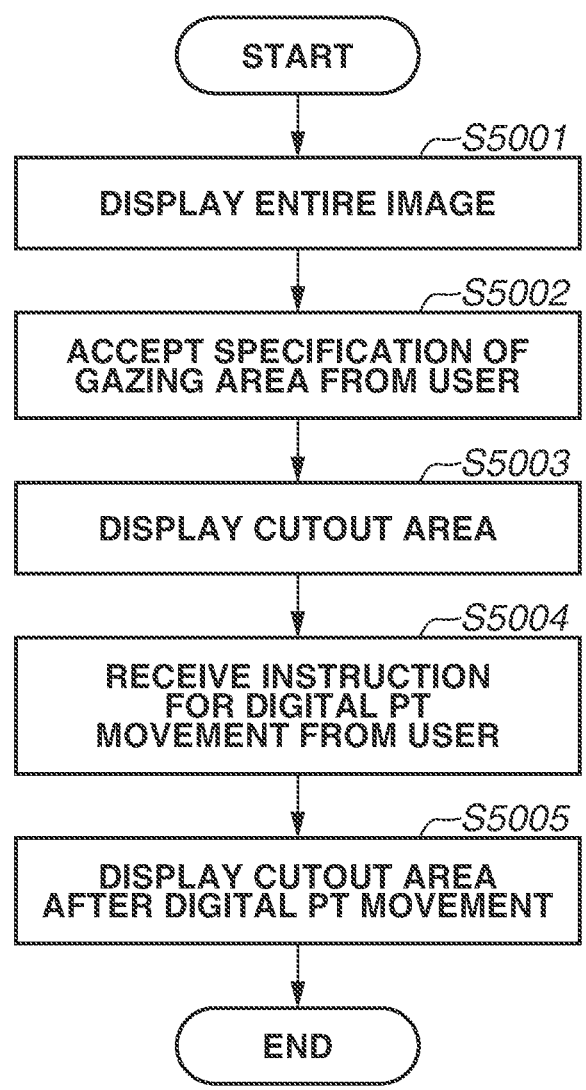
FIG. 5 is a flowchart illustrating operation of a client according to the present exemplary embodiment.

FIG. 5 is a flowchart illustrating every step of processing, from display of an entire image to display of an image of a cutout area after digital PT movement, executed by the client 104.

First, in step S5001, the client 104 transmits an acquisition request of the entire image 106 (tile image A11) to the recording server 103. The system control unit 1301 of the recording server 103 receives the image acquisition request via the communication unit 1303, acquires the first layer entire image 106 from the recording unit 1302, and transmits the entire image 106 to the client 104. The system control unit 1403 of the client 104 receives the entire image 106 via the communication unit 1401 and displays the entire image 106 on the display unit 1402.

In step S5002, the system control unit 1403 accepts a specification of a gazing area input by the user. For example, when the user sets an area 301 of the entire image 106 as a gazing area, the system control unit 1403 determines whether the area 301 can be included in one tile of each of layers. The system control unit 1403 requests the recording server 103 via the communication unit 1401 to transmit a tile (a tile image A37 of the third layer) of the highest layer (a layer having the highest resolution) in which the area 301 can be included. The system control unit 1301 of the recording server 103 receives the image acquisition request via the communication unit 1303, acquires the tile image A37 from the recording unit 1302, and transmits the tile image A37 to the client 104.

In step S5003, the system control unit 1403 receives the tile image A37 via the communication unit 1401, cuts out the area 301 from the tile image A37, and displays the area 301 on the display unit 1402.

Next, in step S5004, the system control unit 1403 of the client 104 receives an instruction for executing digital PT movement from the user. The system control unit 1301 of the recording server 103 receives an image acquisition request via the communication unit 1303 and acquires a tile image corresponding to the image acquisition request from the recording unit 1302. Then, the system control unit 1301 of the recording server 103 transmits the tile image to the client 104 via the communication unit 1303.

In step S5005, the system control unit 1403 of the client 104 receives the tile image via the communication unit 1401, cuts out the area 302 from the tile image, and displays the cutout area 302 on the display unit 1402. The processing in step S5005 will be described below in detail.

Figure 6:
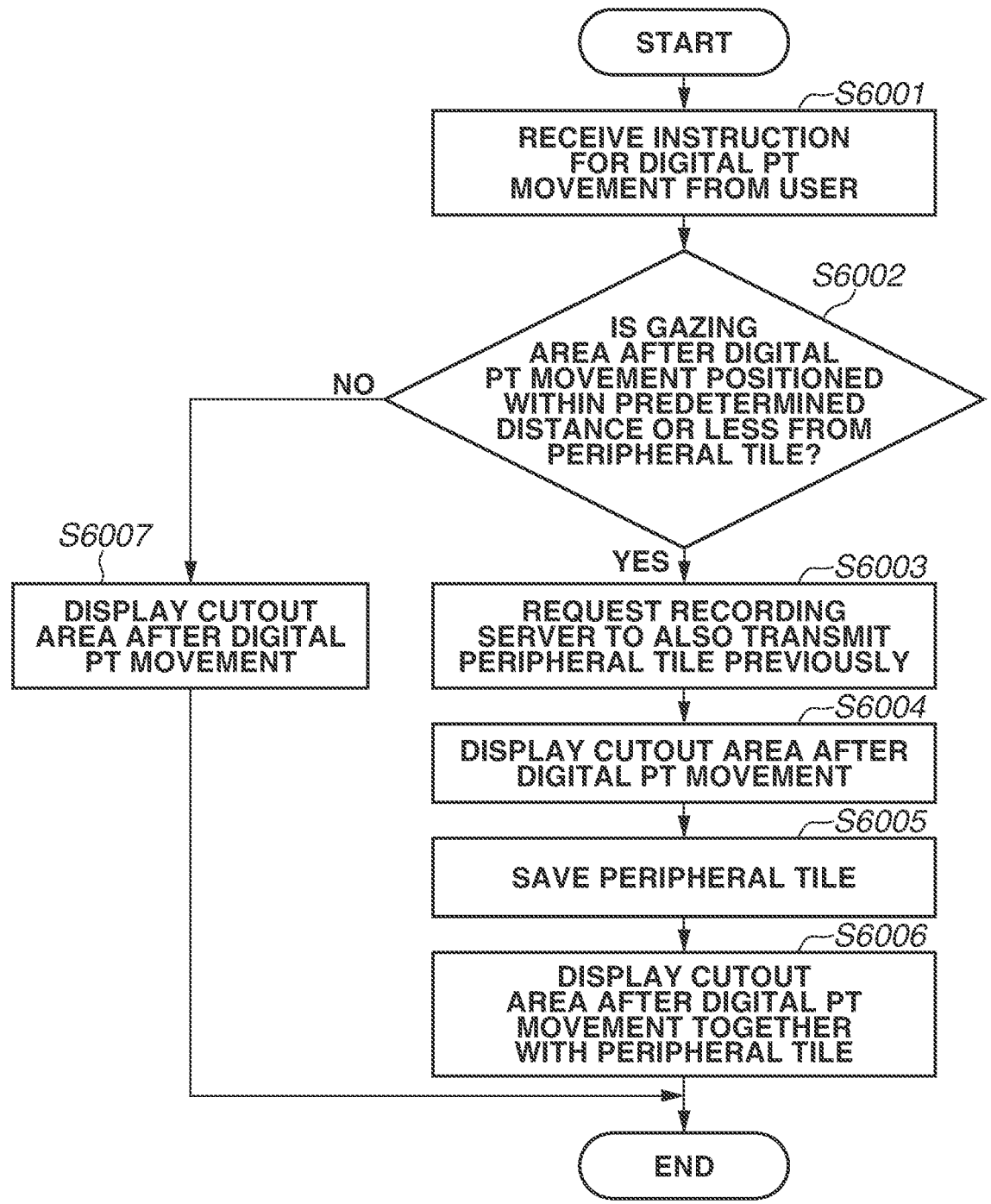
FIG. 6 is a flowchart illustrating operation of the client according to a first exemplary embodiment.

FIG. 6 is a flowchart illustrating processing for executing digital PT movement of a gazing area (i.e., region of interest (ROI)) in a tile image of the third layer, executed by the client 104.

First, it is assumed that the area 301 cut out from the tile image A37 of the third layer in FIG. 4 is displayed on the display unit 1402.

In step S6001, the user instructs the client 104 to execute digital PT movement. Based on the user instruction input via the input unit 1404, the system control unit 1403 moves a position of the gazing area 301.

Next, in step S6002, the system control unit 1403 determines whether a distance between the gazing area after digital PT movement and a peripheral tile is a predetermined value or less.

Figure 7:
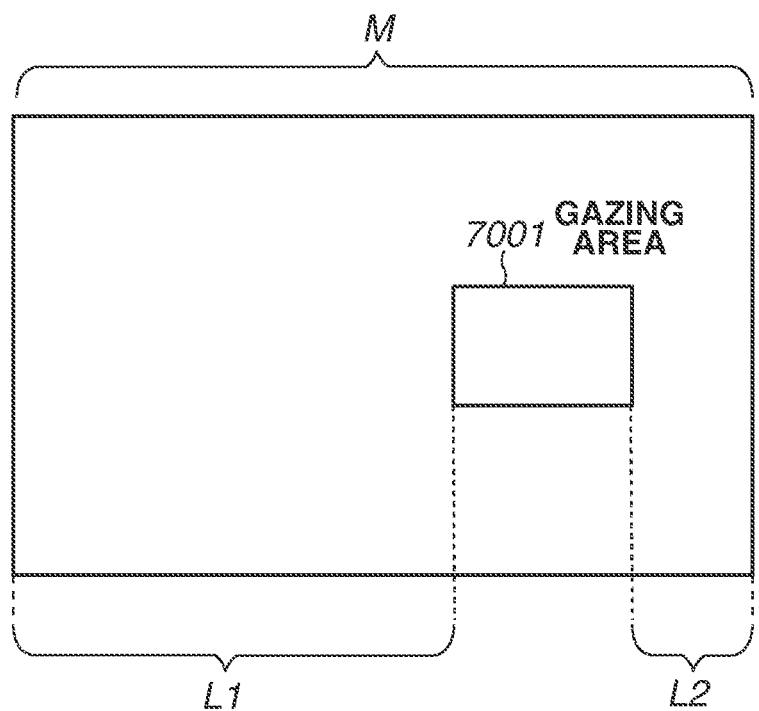
FIG. 7 is a diagram illustrating a position of a gazing area in a tile image.

FIG. 7 is a diagram illustrating a position of the gazing area in the tile after movement. A width of the tile is "M", lengths between the gazing area and adjacent tiles are "L1" and "L2" respectively. In step S6002, the system control unit 1403 determines whether a condition "L1<M/6" or "L2<M/6" is satisfied. If the above condition is not satisfied, i.e., the gazing area after digital PT movement is separated from the peripheral tile by a certain distance or more (NO in step S6002), the processing proceeds to step S6007. On the other hand, if the above condition is satisfied (YES in step S6002), the processing proceeds to step S6003.

In step S6003, the system control unit 1403 requests the recording server 103 to transmit tile images A37 and A36 via the communication unit 1401. The system control unit 1301 of the recording server 103 receives the image acquisition request via the communication unit 1303, acquires the tile image A37 from the recording unit 1302, and transmits the tile image A37 to the client 104 via the communication unit 1303. With respect to the tile image A37, a tile image after digital PT movement can be promptly transmitted without waiting for an intra-frame compressed image because an inter-frame compressed image subsequent to the intra-frame compressed image has been transmitted to the client 104.

Further, at a timing when the tile image A36 is compressed to an intra-frame compressed image, the system control unit 1301 acquires the tile images A37 and A36 from the recording unit 1302 and transmits the tile images A37 and A36 to the client 104 via the communication unit 1303.

In step S6004, the system control unit 1403 receives the tile image A37 via the communication unit 1401 and displays an image of the gazing area cut out from the tile image A37 on the display unit 1402.

In step S6005, the system control unit 1403 receives the tile image A36 via the communication unit 1401 and saves the tile image A36 in a storage unit (not illustrated) until the tile image A36 becomes necessary for displaying the cutout image.

Then, in step S6006, at a timing when the tile image A36 becomes necessary as a result of the digital PT movement, the system control unit 1403 displays images cut out from the tile images A37 and A36 on the display unit 1402. As described above, by previously acquiring the tile image A36 of the adjacent tile positioned in a direction of digital PT movement, the system control unit 1403 does not have to wait for the intra-frame compressed image when the tile image A36 becomes necessary. In other words, a cutout image after digital PT movement can be displayed promptly.

On the other hand, in step S6007, the system control unit 1403 displays an image cutout from the tile image A37 on the display unit 1402. This is because a gazing area after digital PT movement is separated from the adjacent tile by a certain distance when the above-described condition is not satisfied in step S6002, so that an image of the adjacent tile (e.g., tile image A36) does not have to be acquired in advance.

As described above, in the present exemplary embodiment, the client 104 previously acquires the tile image A36 of the adjacent tile in addition to the tile image A37 where the gazing area belongs. With this configuration, in a case where a tile image of the adjacent tile is necessary, it is possible to reduce occurrence of a phenomenon in which an image cannot be displayed until a tile image is compressed to an intra-frame compressed image.

In addition, although digital PT movement in a horizontal direction has been described in FIGS. 4 and 7, similar processing can be executed with respect to movement in a vertical direction.

Further, in step S6002, in a case where a gazing area after digital PT movement is positioned within a predetermined distance or less from both of the tiles adjacent in the horizontal and the vertical directions, tile images of tiles adjacent to these adjacent tiles may also be requested. For example, in a case where the gazing area after digital PT movement is included in the tile image A37, at a position within a certain distance or less from the peripheral tile images in the right and the upper directions, the system control unit 1403 requests the recording server 103 to distribute not only the tile images A36 and A32 but also a tile image A33 adjacent to these tiles A36 and A32. In this way, even in a case where digital PT movement is executed in an oblique direction, it is possible to reduce occurrence frequency of a phenomenon in which an image cannot be displayed until a tile image is compressed to an intra-frame compressed image.

Next, a second exemplary embodiment of the present invention will be described.

Figure 8:
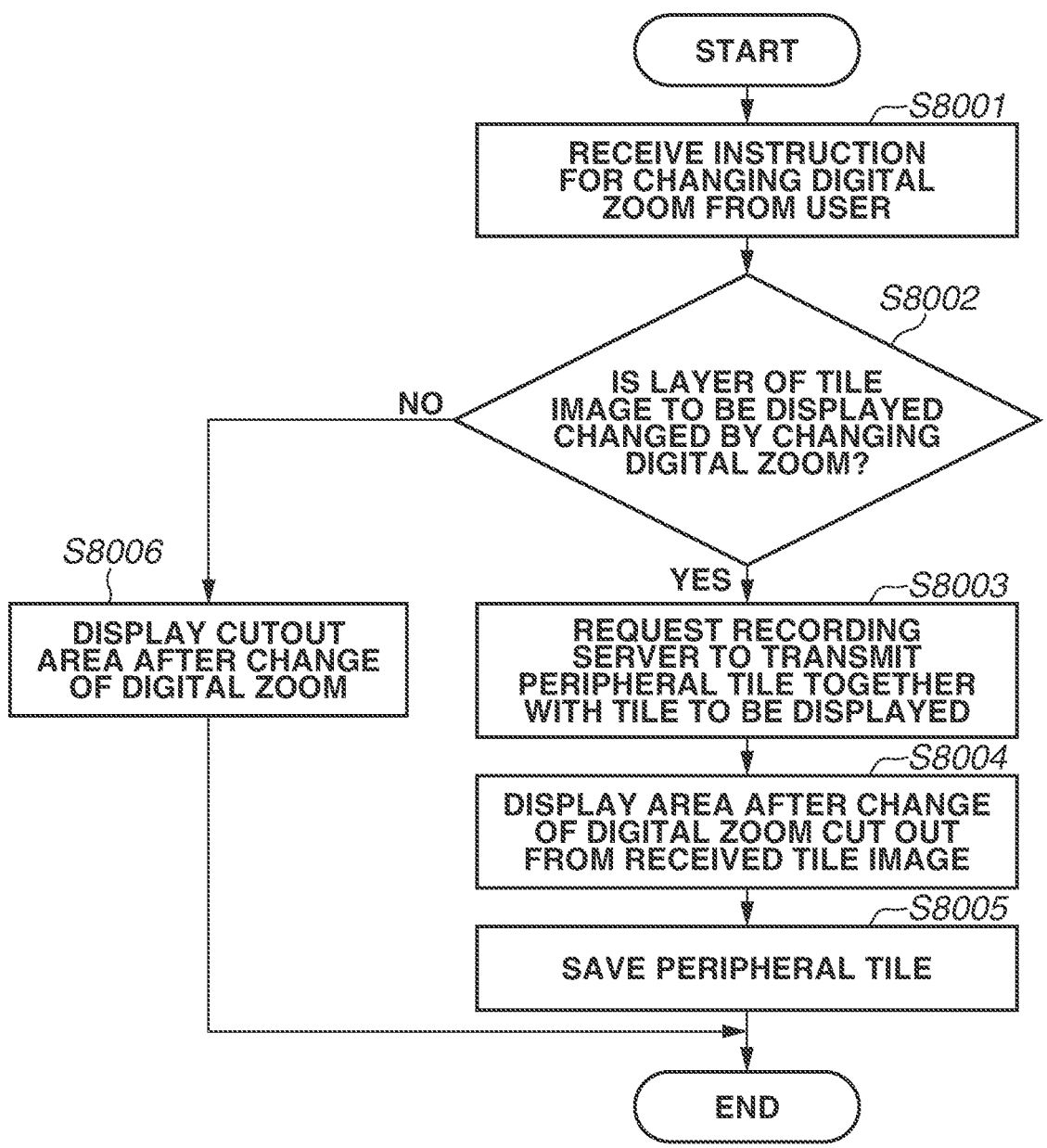
FIG. 8 is a flowchart illustrating operation of the client according to a second exemplary embodiment.

FIG. 8 is a flowchart illustrating processing of the client 104 when digital zoom is executed.

First, in step S8001, in a state where the tile image A11 of the first layer in FIG. 4 is displayed on the display unit 1402, a user instructs the client 104 to execute digital zoom.

In step S8002, the system control unit 1403 determines whether a layer of the tile image used for displaying an image will change as a result of the digital zoom. In a case where a size of the gazing area is large, so that the layer is not changed from the first layer (i.e., a digital zoom magnification is small) (NO in step S8002), the processing proceeds to step S8006. On the other hand, in a case where a gazing area after changing the digital zoom is small, so that a tile image used for displaying an image is changed to a tile image of the third layer (i.e., a digital zoom magnification is large) (YES in step S8002), the processing proceeds to step S8003.

In step S8003, the system control unit 1403 requests the recording server 103 to transmit not only the tile image A37 used for displaying an image but also tile images in its periphery. Specifically, the system control unit 1403 requests 9 tile images, i.e., tile images A38, A39, A310, A311, A36, A33, A32, and A31, and the tile image A37. The system control unit 1301 of the recording server 103 receives the image acquisition request, acquires respective tile images from the recording unit 1302 at a timing when the requested tile images are compressed to intra-frame compressed images, and transmits the tile images to the client 104 via the communication unit 1303.

In step S8004, the system control unit 1403 receives the 9 tile images via the communication unit 1401 and displays an image cut out from the tile image A37 on the display unit 1402.

In step S8005, the system control unit 1403 saves the tile images other than the tile image A37 where the gazing area belongs in a storage unit (not illustrated) of the client 104.

On the other hand, in step S8006, the system control unit 1403 displays an image cut out from the tile image A11 on the display unit 1402.

As described above, according to the present exemplary embodiment of the present invention, when a layer of the tile image used for displaying an image is changed as a result of the digital zoom, the system control unit 1403 requests the recording server 103 to previously transmit peripheral tile images in addition to the tile image used for displaying an image. Through the above-described processing, in a case where a peripheral tile image becomes necessary as a result of digital PT movement executed after digital zoom, the system control unit 1403 can promptly display an image by cutting out the gazing area from a necessary tile image.

Figure 9:
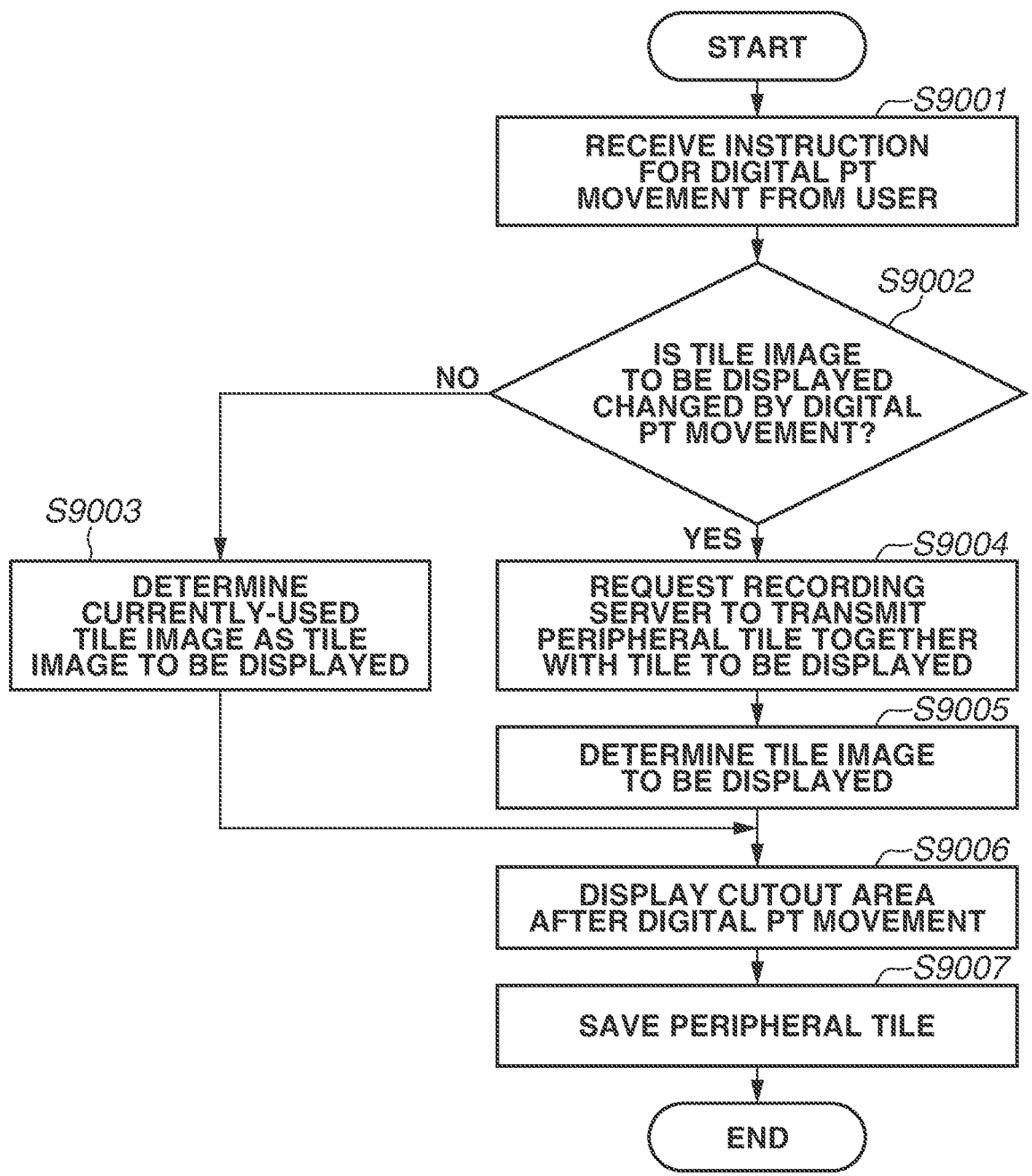
FIG. 9 is a flowchart illustrating operation of the client according to a third exemplary embodiment.

Next, a processing flow in FIG. 9 according to a third exemplary embodiment will be described. First, it is assumed that the area 301 cut out from the tile image A37 of the third layer in FIG. 4 is displayed on the display unit 1402.

In step S9001, the user operates the input unit 1404 to instruct the client 104 to execute digital PT movement.

In step S9002, the system control unit 1403 determines whether a tile image necessary for displaying an image will change as a result of the digital PT movement. If a tile image necessary for displaying an image does not changed from the tile image A37 as a result of the digital PT movement (NO in step S9002), the processing proceeds to step S9003. On the other hand, if a tile image necessary for displaying an image changed from the tile image A37 as a result of the digital PT movement (YES in step S9002), the processing proceeds to step S9004.

In step S9004, the system control unit 1403 requests the recording server 103 to transmit peripheral tile images in addition to the tile images A37 and A36 via the communication unit 1303. Specifically, the system control unit 1403 requests the recording server 103 to transmit tile images A35, A34, A33, A32, A31, A38, A39, A310, A311, and A312 in addition to the tile images A37 and A36. The system control unit 1301 of the recording server 103 receives the image acquisition request via the communication unit 1303, acquires the tile images A37 and A36 from the recording unit 1302, and transmits the tile images A37 and A36 to the client 104 via the communication unit 1303. Tile images A37 and A36 after digital PT movement can be promptly transmitted because inter-frame compressed images after the intra-frame compressed images have been transmitted to the client 104.

At a timing when the tile images A35, A34, A33, A32, A31, A38, A39, A310, A311, and A312 are compressed to intra-frame compressed images, the system control unit 1301 acquires the respective tile images from the recording unit 1302. Then, the system control unit 1301 transmits the tile images to the client 104 via the communication unit 1303. Herein, from among the tile images transmitted from the recording server 103, the system control unit 1301 stops transmitting the tile images which are not requested this time.

In addition, the system control unit 1403 of the client 104 does not have to request a tile image requested already, from among the peripheral tile images to be requested to the recording server 103 in step S9004. In this case, the system control unit 1403 notifies the recording server 103 of a previously-requested tile image that is no longer necessary as a result of digital PT movement.

In step S9005, the system control unit 1403 receives the tile images A37 and A36 via the communication unit 1401 and determines to display images cut out from the tile images A37 and A36.

Then, in step S9006, the system control unit 1403 displays the images cut out from the tile images A37 and A36 on the display unit 1402.

In step S9007, the system control unit 1403 receives data of the tile images A35, A34, A33, A32, A31, A38, A39, A310, A311, and A312 via the communication unit 1401. Then, the system control unit 1403 saves the received data in a storage unit (not illustrated) until the data becomes necessary for displaying an image as a result of digital PT movement.

On the other hand, in step S9003, the system control unit 1403 determines the tile image A37 as a tile image to be used for displaying an image. Then, the processing proceeds to step S9006.

As described above, in the present exemplary embodiment, before digital PT movement is executed, the client 104 previously receives tile images in a periphery of the tile image that includes the gazing area. With this configuration, in a case where the adjacent tile image becomes necessary as a result of digital PT movement, it is possible to reduce occurrence of a phenomenon in which an image cannot be displayed until the tile image is compressed to an intra-frame compressed image. Further, in a case where digital PT movement is executed in an oblique direction from the area 301 to the area 303, for example, it is possible to reduce occurrence frequency of a phenomenon in which an image cannot be displayed until the tile image is compressed to an intra-frame compressed image.

Figure 10:
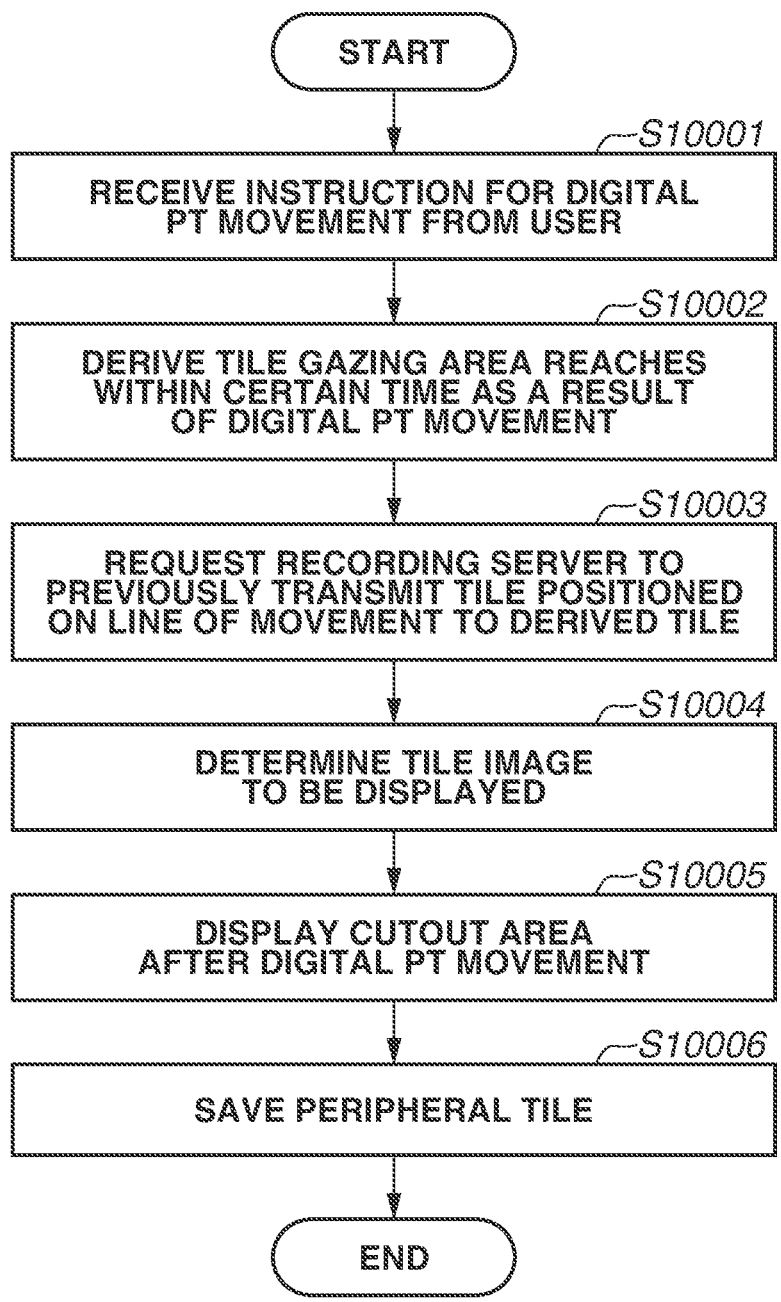
FIG. 10 is a flowchart illustrating operation of the client according to a fourth exemplary embodiment.

FIG. 10 is a flowchart illustrating processing of the client 104 according to a fourth exemplary embodiment.

First, it is assumed that the area 301 cut out from the tile image A37 of the third layer in FIG. 4 is displayed on the display unit 1402.

In step S10001, the user operates the input unit 1404 to instruct the client 104 to execute digital PT movement.

In step S10002, the system control unit 1403 derives a tile image the gazing area reaches within a certain time as a result of digital PT movement executed at a speed specified by the user.

Next, in step S10003, the system control unit 1403 requests the recording server 103 to previously transmit tile images existing on a line of movement to the derived tile image. For example, it is assumed that the system control unit 1403 determines that the gazing area reaches the tile image A35 within 1 second in a case where digital PT movement is executed at the same speed as the movement from the area 301 to the area 302. In this case, the system control unit 1403 requests the recording server 103 to transmit the tile images A37, A36, and A35 via the communication unit 1401. The system control unit 1301 of the recording server 103 receives the image acquisition request via the communication unit 1303, acquires the tile image A37 from the recording unit 1302, and transmits the tile image A37 to the client 104 via the communication unit 1303. Herein, in a case where an inter-frame compressed image subsequent to an intra-frame compressed image for the tile image A36 has already been transmitted to the client 104, the system control unit 1301 acquires the tile image A36 from the recording unit 1302 together with the tile image A37, and transmits the tile images A36 and A37 to the client 104 via the communication unit 1303. Then, the system control unit 1301 acquires the tile image A35 from the recording unit 1302 together with the tile images A37 and A36 at a timing when the tile image A35 is compressed to an intra-frame compressed image, and transmits the tile images A37, A36, and A35 to the client 104 via the communication unit 1303. In addition, although the movement in the horizontal direction has been described in the present exemplary embodiment, similar processing can be executed with respect to the movement in the vertical direction or the oblique direction. Because the digital PT movement can be executed in both of the horizontal and the vertical directions simultaneously, a tile image the gazing area reaches within a certain time is derived from a velocity vector (i.e., a moving direction and a moving speed of the gazing area).

In step S10004, the system control unit 1403 determines a tile image necessary for displaying an image after digital PT movement. In the present exemplary embodiment, the tile images A37 and A36 will be used.

In step S10005, the system control unit 1403 receives the tile images A37 and A36 via the communication unit 1401 and displays images cut out from the tile images A37 and A36 on the display unit 1402.

Then, in step S10006, the system control unit 1403 receives data of the tile image A35 via the communication unit 1401 and save the data of the tile image A35 in a storage unit (not illustrated) until the tile image A35 becomes necessary for displaying an image as a result of digital PT movement.

As described above, by previously receiving all of tile images the gazing area reaches within a certain time as a result of digital PT movement, it is possible to reduce occurrence frequency of a phenomenon in which an image cannot be displayed until the tile image is compressed to an intra-frame compressed image even in a case where digital PT movement is executed at high speed.

In the present exemplary embodiment, although the tile image the gazing area reaches within a certain time is derived from the speed of the digital PT movement, the tile image used before digital PT movement may be saved for a while. For example, after the tile image used for displaying an image is switched as a result of the digital PT movement, the system control unit 1403 continuously requests the recording server 103 to transmit tile images for a certain period of time and stores the tile images in the client 104. In this way, it is possible to reduce occurrence frequency of a phenomenon in which an image cannot be displayed until the tile image is compressed to an intra-frame compressed image in a case where the user repeatedly displays images of a plurality of positions.

Other Exemplary Embodiments

Figure 11:
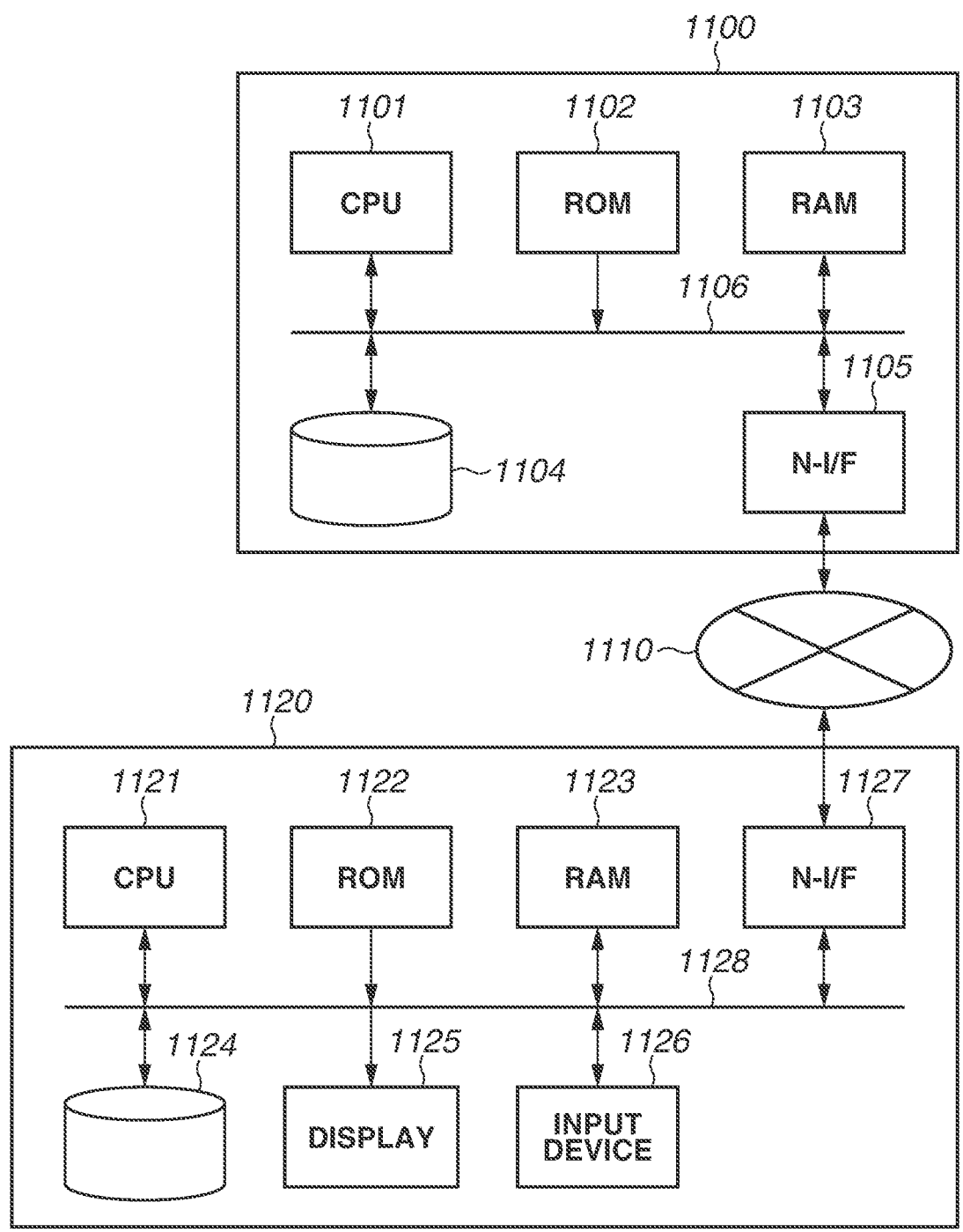
FIG. 11 is a block diagram illustrating an example of a hardware configuration according to the exemplary embodiments.

FIG. 11 is a block diagram illustrating an example of a hardware configuration of a computer which executes a program to implement the processing according to the above-described exemplary embodiments.

In a recording server 1100, a CPU 1101 executes a program to implement the above-described various types of processing. In addition, an imaging apparatus itself may function as the recording server 1100.

A ROM 1102 is a read-only memory (storage medium) that stores programs executed by the CPU 1101 and various types of data. A random access memory (RAM) 1103 is used as a work memory of the CPU 1101, and data can be written in and read from the RAM 1103 whenever necessary. For example, a secondary storage device 1104 is a hard disk, and stores various programs executed by the CPU 1101 and images received from the imaging apparatus 102. A program stored in the secondary storage device 1104 is loaded on the RAM 1103 as necessary and executed by the CPU 1101. A network interface 1105 connects the recording server 1100 to a local area network (LAN) 1110. The above-described constituent elements are communicably connected to each other via a bus 1106.

In a client apparatus 1120, a CPU 1121 executes a program to implement the above-described various types of processing. A ROM 1122 is a read-only memory (storage medium) that stores programs executed by the CPU 1121 and various types of data. A RAM 1123 is used as a work memory of the CPU 1121, and data can be written in and read from the RAM 1123 whenever necessary. For example, a secondary storage device 1124 is a hard disk, and stores various programs executed by the CPU 1121 and images acquired by the imaging apparatus 102. A program stored in the secondary storage device 1124 is loaded on the RAM 1123 as necessary and executed by the CPU 1121. A display 1125 is controlled by the CPU 1121 to display a user interface screen. An input device 1126 is configured of a keyboard and a pointing device (i.e., mouse), and accepts a user instruction. A network interface 1127 connects the client apparatus 1120 to the LAN 1110. A touch panel arranged on a screen of the display 1125 may be used as the input device 1126. The above-described constituent elements are communicably connected to each other via a bus 1128.

Although the exemplary embodiments of the present invention have been described as the above, the present invention is not limited to the above-described exemplary embodiments, and many variations and modifications are possible within a scope of the present invention.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-020169, filed Feb. 7, 2020, which is hereby incorporated by reference herein in its entirety.

What is claimed is:

1. An image distribution apparatus, comprising:
an acquisition unit configured to acquire information about a gazing area specified by a user in a first image; and
a transmission unit configured to transmit, from a second image having resolution higher than resolution of the first image and divided into a plurality of tile images, a first tile image where the gazing area belongs and a second tile image adjacent to the first tile image,
wherein the transmission unit transmits the second tile image depending on a position of the gazing area in the first tile image.

2. The image distribution apparatus according to claim 1, wherein the transmission unit transmits the second tile image depending on a distance between the gazing area and the second tile image.

3. The image distribution apparatus according to claim 1, wherein the transmission unit transmits the first tile image and the second tile image in a case where the distance between the gazing area and the second tile image is a predetermined value or less, and transmits only the first tile image in a case where the distance between the gazing area and the second tile image is greater than the predetermined value.

4. The image distribution apparatus according to claim 1, wherein the transmission unit transmits a third tile image adjacent to the second tile image depending on the position of the gazing area in the first tile image.

5. The image distribution apparatus according to claim 4, wherein the transmission unit transmits the third tile image depending on a moving speed of the gazing area.

6. The image distribution apparatus according to claim 1, wherein the transmission unit transmits a plurality of tile images in a periphery of the first tile image together with the first tile image.

7. A method, comprising:
acquiring information about a gazing area specified by a user hi a first image; and
transmitting, from a second image having resolution higher than resolution of the first image and divided into a plurality of tile images, a first tile image where the gazing area belongs and a second tile image adjacent to the first tile image,
wherein the transmitting transmits the second tile image depending on a position of the gazing area in the first tile image.

8. A non-transitory computer-readable storage medium storing a program for causing a computer to execute a method, comprising:
acquiring information about a gazing area specified by a user in a first image; and
transmitting, from a second image having resolution higher than resolution of the first image divided into a plurality of tile images, a first tile image where the gazing area belongs and a second tile image adjacent to the first tile image,
wherein the transmitting transmits the second tile image depending on a position of the gazing area in the first tile image.

9. A method, comprising:
accepting a specification of a gazing area specified by a user in a first image;
transmitting information about the accepted gazing area; and
receiving, from a second image having resolution higher than resolution of the first image and divided into a plurality of tile images, a first tile image where the gazing area belongs and a second tile image adjacent to the first tile image,
wherein the second tile image depends on a position of the gazing area in the first tile image.

10. The method according to claim 9, wherein, in the receiving, the second tile image is received depending on a distance between the gazing area and the second tile image.

11. The method according to claim 10, further comprising receiving the first tile image and the second tile image in a case where the distance between the gazing area and the second tile image is a predetermined value or less, and receiving only the first tile image in a case where the distance between the gazing area and the second tile image is greater than the predetermined value.

12. The method according to claim 9, further comprising receiving a third tile image adjacent to the second tile image depending on the position of the gazing area in the first tile image.

13. A non-transitory computer-readable storage medium storing a program for causing a computer to execute a method comprising:
accepting a specification of a gazing area specified by a user in a first image;
transmitting information about the accepted gazing area; and
receiving, from a second image having resolution higher than resolution of the first image and divided into a plurality of tile images; a first tile image where the gazing area belongs and a second tile image adjacent to the first tile image,
wherein the second tile image depends on a position of the gazing area in the first tile image.

* * * * *